(12) United States Patent
Song et al.

(10) Patent No.: US 10,333,418 B2
(45) Date of Patent: Jun. 25, 2019

(54) CONTROL DEVICE AND CONTROL METHOD

(71) Applicant: Delta Electronics (Shanghai) CO., LTD, Shanghai (CN)

(72) Inventors: Haibin Song, Shanghai (CN); Jinfa Zhang, Shanghai (CN); Daofei Xu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 15/944,815

(22) Filed: Apr. 4, 2018

(65) Prior Publication Data
US 2018/0294735 A1 Oct. 11, 2018

(30) Foreign Application Priority Data

Apr. 10, 2017 (CN) .......................... 2017 1 0229468
Jun. 30, 2017 (CN) .......................... 2017 1 0524223

(51) Int. Cl.
*H02M 3/335* (2006.01)
*H02M 1/08* (2006.01)
*H02M 1/00* (2006.01)

(52) U.S. Cl.
CPC ....... *H02M 3/33592* (2013.01); *H02M 1/083* (2013.01); *H02M 2001/0058* (2013.01); *Y02B 70/1475* (2013.01); *Y02B 70/1491* (2013.01)

(58) Field of Classification Search
CPC ........ H02M 1/08; H02M 1/083; H02M 3/335; H02M 3/33507; H02M 3/33553; H02M 3/33592; H02M 2001/0058
See application file for complete search history.

(56) References Cited

U.S. PATENT DOCUMENTS

| | | | |
|---|---|---|---|
| 5,991,172 A | 11/1999 | Jovanovic et al. | |
| RE38,196 E * | 7/2003 | Vinciarelli | H02M 1/34 363/16 |
| 8,089,783 B2 * | 1/2012 | Tao | H02M 3/33507 363/21.18 |
| 8,279,631 B2 * | 10/2012 | Yang | H02J 7/0072 363/20 |

(Continued)

FOREIGN PATENT DOCUMENTS

| | | |
|---|---|---|
| CN | 104539163 A | 4/2015 |
| TW | 200717978 A | 5/2007 |
| TW | 201119170 A | 6/2011 |

OTHER PUBLICATIONS

The Taiwanese 1OA issued by TIPO dated Jun. 4, 2018.
The CN1OA dated May 8, 2019 by the CNIPA.

*Primary Examiner* — Matthew V Nguyen
(74) *Attorney, Agent, or Firm* — Yunling Ren

(57) ABSTRACT

A control device applied to a flyback converter including an auxiliary switch includes: an output voltage integrator, configured to integrate an output voltage of the flyback converter to obtain an amplitude of a negative magnetizing current of the flyback converter; and a comparator controller, configured to compare the obtained amplitude of the negative magnetizing current with a reference value, and turn off the auxiliary switch according to a comparison result. According to the present disclosure, it is able to achieve zero voltage switching of a primary-side switch of the flyback converter with variable outputs.

25 Claims, 15 Drawing Sheets

(56) References Cited

U.S. PATENT DOCUMENTS

| | | |
|---|---|---|
| 2010/0027298 A1 | 2/2010 | Cohen |
| 2012/0119676 A1* | 5/2012 | Yao .................. H01F 38/42 |
| | | 315/297 |
| 2014/0204625 A1 | 7/2014 | Liu et al. |
| 2015/0249398 A1* | 9/2015 | Halberstadt ....... H02M 3/33592 |
| | | 363/21.14 |
| 2016/0164422 A1* | 6/2016 | Valley ............... H02M 3/33523 |
| | | 363/21.16 |
| 2016/0233779 A1 | 8/2016 | Cohen |
| 2017/0093289 A1* | 3/2017 | Yang ................ H02M 3/33507 |

* cited by examiner

CONTROL DEVICE AND CONTROL METHOD

CROSS REFERENCE

This application is based upon and claims priority to Chinese Patent Application No. 201710229468.1, filed on Apr. 10, 2017, and Chinese Patent Application No. 201710524223.1, filed on Jun. 30, 2017 the entire contents thereof are incorporated herein by reference.

TECHNICAL FIELD

The present disclosure relates to the field of power electronic technologies, and more particularly, to a control device and control method applied to a flyback converter.

BACKGROUND

Flyback converter is widely adopted for low power off-line applications, such as notebook adapter, cell phone charger etc. Quasi-resonant (QR) flyback is particularly popular because of less switching loss. It operates in discontinuous current conduction mode, and achieves zero voltage switching (ZVS) at low line and partial hard switching at high line. Recently there is growing need for higher power density for adapters, and high switching frequency design accompanied by efficiency improvement is necessary to pass thermal requirement in a smaller volume. QR flyback typically operates below 150 kHz, and switching loss becomes dominant when switching frequency further increases, especially at high line condition. Soft switching flyback converter were introduced to run at higher switching frequency (300~1 MHz) with optimized efficiency. With new control method, QR flyback with synchronous rectifier (SR) can achieve ZVS for both low line and high line conditions. Before turning on the primary main switch, the SR is controlled to get inverse secondary side current, and then the inverse current is transferred to primary side to discharge parasitic capacitance of the primary main switch for ZVS. Active clamp flyback (ACF) is a two-switch topology that achieves soft switching. Operating in continuous current mode (CCM), or discontinuous current mode (DCM), it can achieve full ZVS, and furthermore, ACF recycles leakage inductance energy, which benefits both efficiency and device stress.

So far, soft switching flyback converter mentioned above is developed for fixed output voltage application. For wide range output applications such as USB PD adapter, ZVS may be lost, or efficiency may be degraded due to excessive circulation current.

Therefore, it is an urgent need to propose a control device and a control method that can improve the above problems in related art.

It is to be noted that the above information disclosed in this Background section is only for enhancement of understanding of the background of the present disclosure and therefore it may contain information that does not form the prior art that is already known to a person of ordinary skill in the art.

SUMMARY

An objective of the present disclosure is to provide a control device and a control method, so as to overcome, at least to a certain extent, one or more problems caused by limitation and defects of related technologies.

According to an aspect of the present disclosure, there is provided a control device, which is applied to a flyback converter. The flyback converter includes an auxiliary switch, and the control device includes: an output voltage integrator, configured to integrate an output voltage of the flyback converter to obtain an amplitude of a negative magnetizing current of the flyback converter; and a comparator controller, configured to compare the obtained amplitude of the negative magnetizing current with a reference value, and turn off the auxiliary switch according to a comparison result.

According to an aspect of the present disclosure, there is provided a switching power supply, which includes the control device according to any one of the above embodiments.

According to an aspect of the present disclosure, there is provided a control method, which is applied to a flyback converter. The flyback converter includes an auxiliary switch, and the control method includes: integrating an output voltage of the flyback converter to obtain an amplitude of a negative magnetizing current of the flyback converter; comparing the obtained amplitude of the negative magnetizing current with a reference value; and turning off the auxiliary switch according to a comparison result to achieve zero voltage switching of a primary-side power switch of the flyback converter.

It should be understood that the above general description and the detailed description below are merely exemplary and explanatory, and do not limit the present disclosure.

BRIEF DESCRIPTION OF THE DRAWINGS

The accompanying drawings are incorporated in and constitute a part of this specification, illustrate embodiments conforming to the disclosure and together with the description serve to explain the principles of the disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
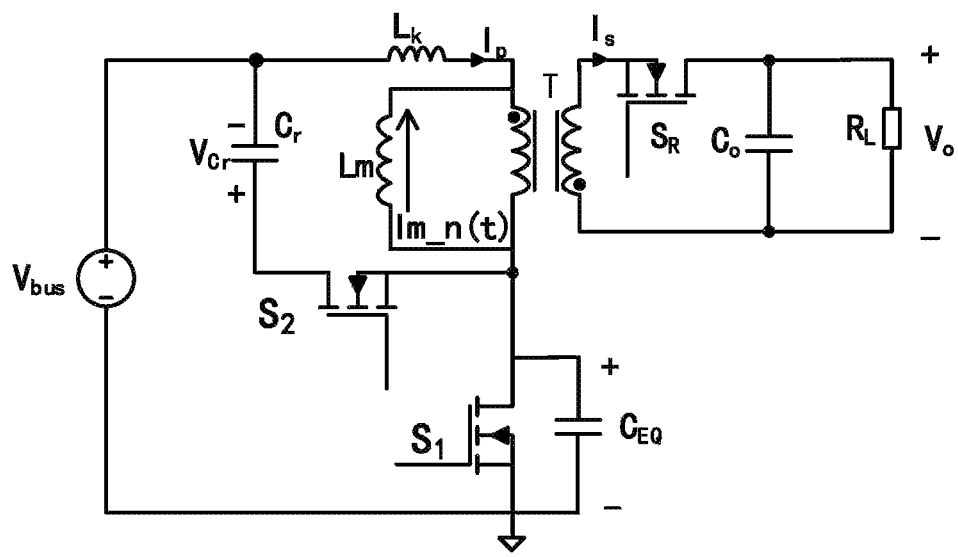
FIG. 1 schematically illustrates a circuit diagram of an active clamp flyback converter according to a typical structure.

The exemplary embodiments will now be described more fully with reference to the accompanying drawings. However, the exemplary embodiments can be implemented in a variety of forms and should not be construed as limited to the embodiments set forth herein. Rather, the embodiments are provided so that the present disclosure will be thorough and complete and will fully convey the concepts of exemplary embodiments to those skilled in the art. The features, structures, or characteristics described may be combined in one or more embodiments in any suitable manner. In the following description, numerous specific details are provided to give a full understanding of the embodiments of the present disclosure. Those skilled in the art will recognize, however, that the technical solution of the present disclosure may be practiced without one or more of the specific details described, or that other methods, components, materials, etc. may be employed. In other instances, well-known technical solutions are not shown or described in detail to avoid obscuring aspects of the present disclosure.

In addition, the accompanying drawings are merely exemplary illustration of the present disclosure, and are not necessarily drawn to scale. The same reference numerals in the drawings denote the same or similar parts, and thus repeated description thereof will be omitted. Some block diagrams shown in the figures are functional entities and not necessarily to be corresponding to a physically or logically individual entities. These functional entities may be implemented in software form, or implemented in one or more hardware modules or integrated circuits, or implemented in different networks and/or processor apparatuses and/or microcontroller apparatuses.

Figure 2:
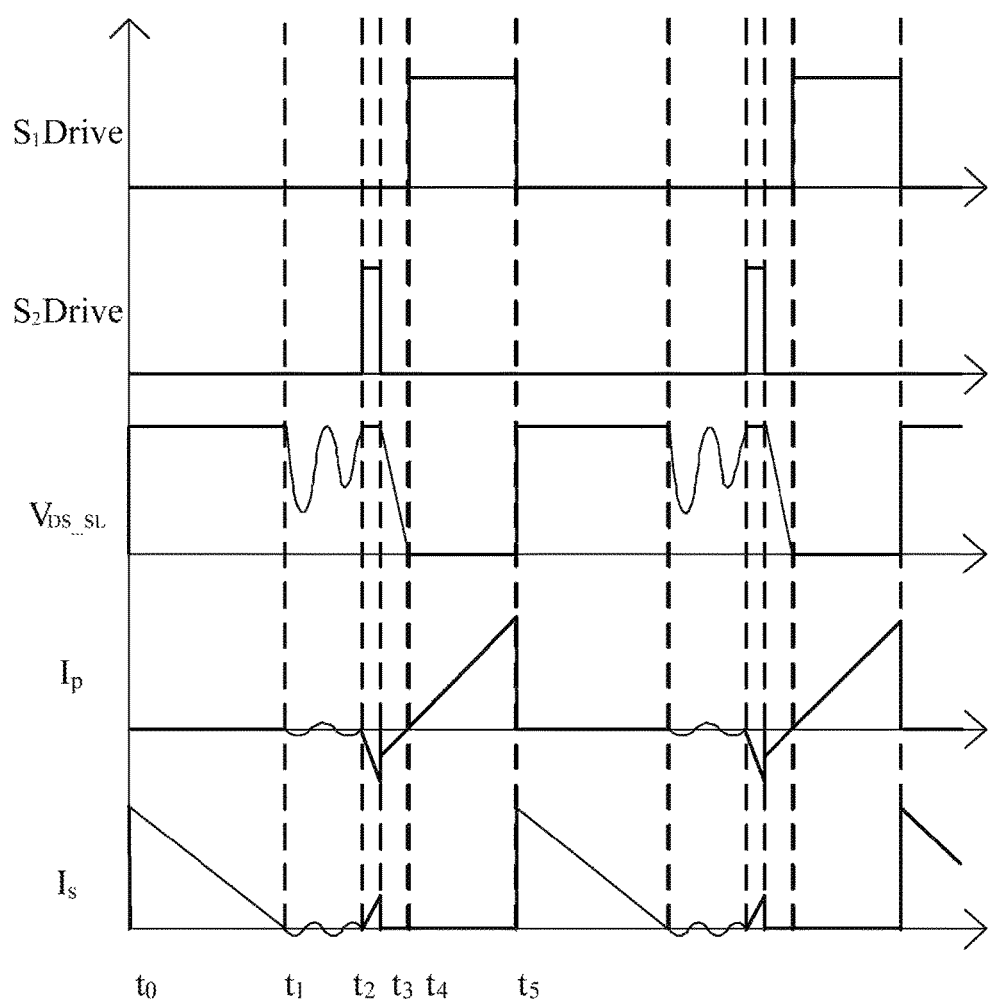
FIG. 2 schematically illustrates a discontinuous current mode control waveform diagram of an active clamp flyback converter according to a typical structure.

FIG. 1 illustrates a circuit diagram of an active clamp flyback converter according to a typical structure, by which zero voltage switching (ZVS) of a primary-side power switch $S_1$ may be achieved. An exemplary control method may be implemented by turning on a clamp switch $S_2$ for a set time (for example, $t_2$-$t_3$ in the control waveform diagram as shown in FIG. 2) only before the primary-side power switch $S_1$ is turned on.

Figure 3:
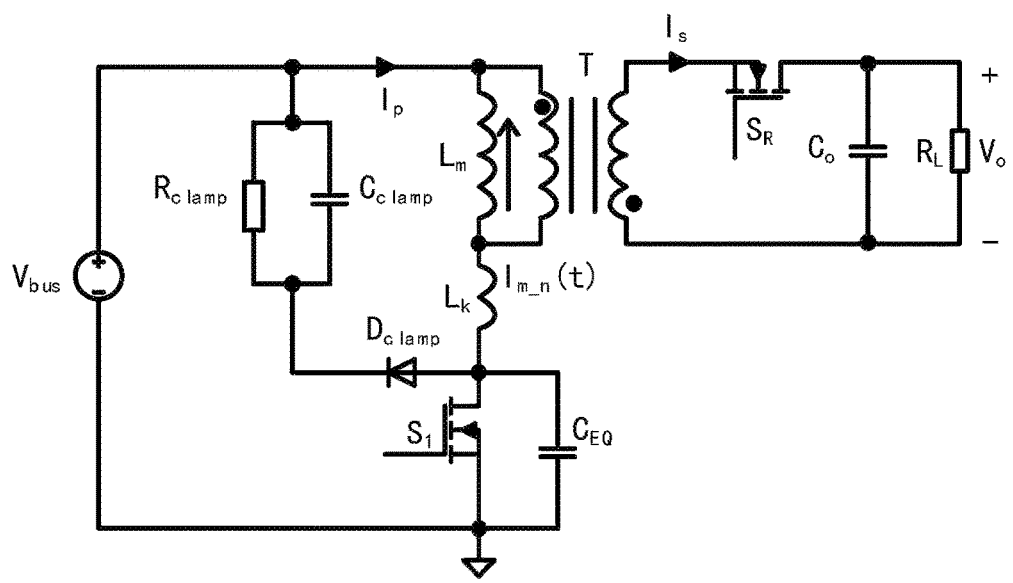
FIG. 3 schematically illustrates a circuit diagram of an RCD (Resistor Capacitor Diode) clamp flyback converter according to a typical structure.
Figure 4:
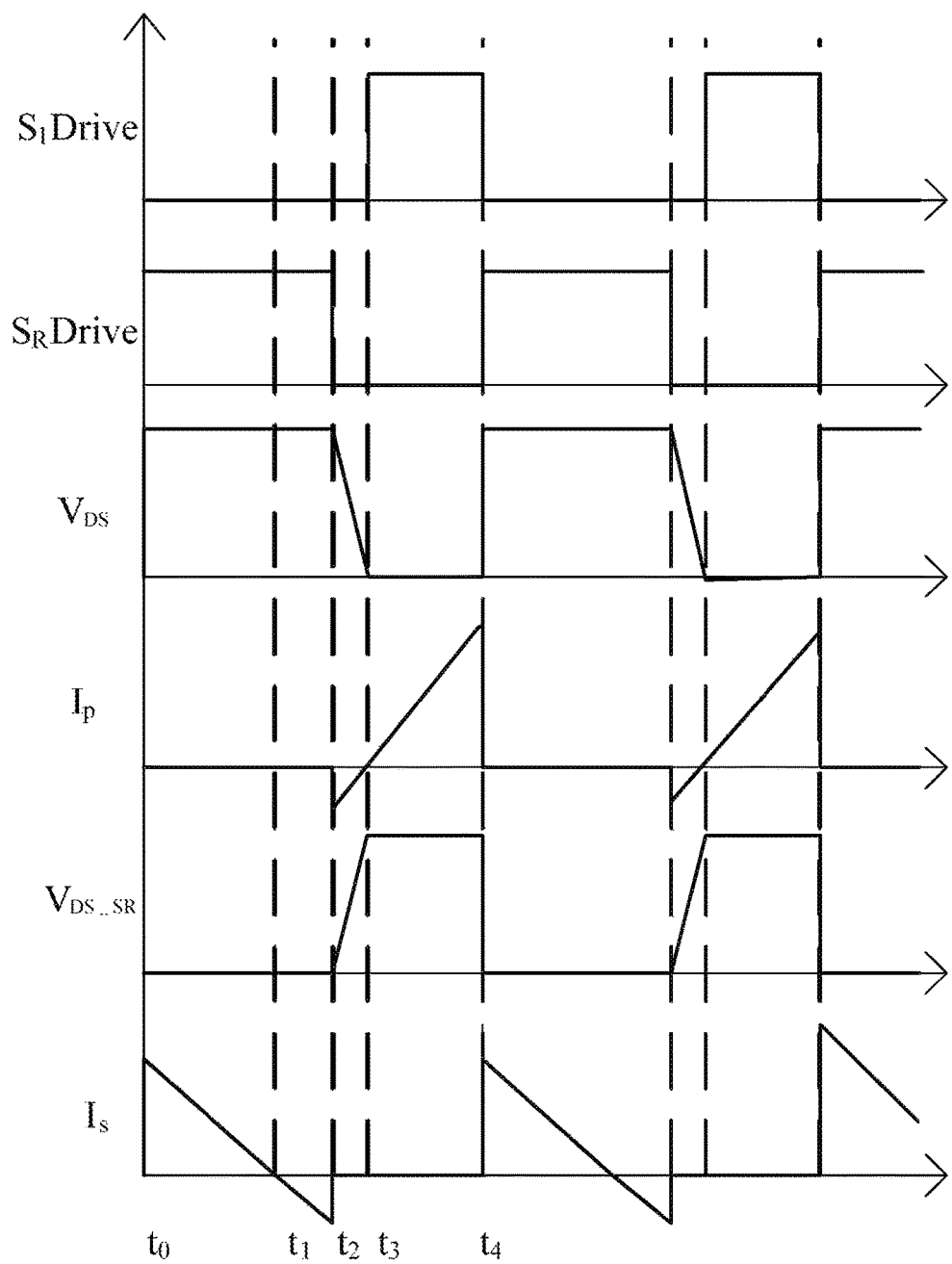
FIG. 4 schematically illustrates a discontinuous current mode boundary control waveform diagram of an RCD clamp flyback converter according to a typical structure.

FIG. 3 illustrates a circuit diagram of an RCD clamp flyback converter according to a typical structure, by which zero voltage switching (ZVS) of the primary-side power switch $S_1$ may be achieved by delaying in turning on a secondary-side synchronous rectifier $S_R$ of a quasi-resonant flyback converter. An exemplary control method for delaying in turning on the secondary-side synchronous rectifier $S_R$ may be implemented by further maintaining, after a secondary-side current $i_s$ of the synchronous rectifier $S_R$ dropping to zero, the synchronous rectifier turn-on for a set time, such as $t_1$-$t_2$ in the control waveform diagram as shown in FIG. 4.

The above two methods for achieving the zero voltage switching (ZVS) of the primary-side power switch $S_1$ are implemented by turning on the synchronous rectifier $S_R$ or the clamp switch $S_2$ for a set time, which is applicable to an application scenario where the output voltage is constant.

However, with the development of a power adapter, particularly the promotion of USB-PD Type-C, the application of a variable outputs becomes more and more popular. For an application scenario of the variable outputs, the above control mode is not applicable any more. This is because no matter the RCD clamp flyback converter or the active clamp flyback converter has the following basic principle of achieving the zero voltage switching (ZVS) of the primary-side power switch: before the primary-side power switch $S_1$ is turned on, a negative magnetizing current $I_{m\_n}$ is generated on an magnetizing inductor $L_m$ of a transformer, the zero voltage switching (ZVS) of the primary-side power switch $S_1$ is achieved by the negative magnetizing current $I_{m\_n}$, and the magnitude of the negative magnetizing current depends on the following formula:

$$I_{m\_n}(t) = \frac{n}{L_m} V_o t \qquad (1)$$

where $L_m$ is the magnetizing inductance value of the transformer, n is a turn ratio of the transformer, $V_o$ is an output voltage value of a transducer, $I_{m\_n}(t)$ is an amplitude of the negative magnetizing current, and t is on-time of the auxiliary switch, e.g. delayed on-time for the synchronous rectifier of the quasi-resonant flyback converter, or on-time for the clamp switch of the active clamp flyback converter.

As can be seen from the above formula, both the magnetizing inductance $L_m$ and the turn ratio n are fixed for a concrete design. When the output voltage $V_o$ is fixed, as can be seen from Formula (1), the fixed on-time t is fixed and the fixed on-time t signifies a fixed amplitude of the negative magnetizing current. Therefore, turning on the synchronous rectifier $S_R$ or the clamp switch $S_2$ for the set time t is applicable to an application scenario where the output voltage is constant. When the output voltage is variable, the fixed on-time signifies that the amplitude of the negative magnetizing current may vary with variable output voltage. Taking the application of USB-PD Type-C as an example, the minimum output voltage is 5V, and the maximum output voltage is 20V. When the control method of the fixed on-time is adopted, either one of the following two results may be caused.

Result A: If the set on-time may exactly satisfy the condition of the zero voltage switching (ZVS) of the primary-side power switch when the output voltage is 5V, the amplitude of the negative magnetizing current generated in an application scenario where the output voltage is 20V will be four times as much as that in an application scenario where the output voltage is 5V. Extra loss may be introduced by excessively large negative magnetizing current may introduce, and thus a negative effect may be applied on the efficiency of the converter.

Result B: If the set on-time may exactly satisfy the condition of the zero voltage switching (ZVS) of the primary-side power switch when the output voltage is 20V, when the output voltage is 5V, the amplitude of the negative magnetizing current generated in an application scenario where the output voltage is 5V will be only ¼ of that in an application scenario where the output voltage is 20V. The primary-side power switch may be unable to achieve the zero voltage switching due to excessively small negative magnetizing current.

Figure 6:
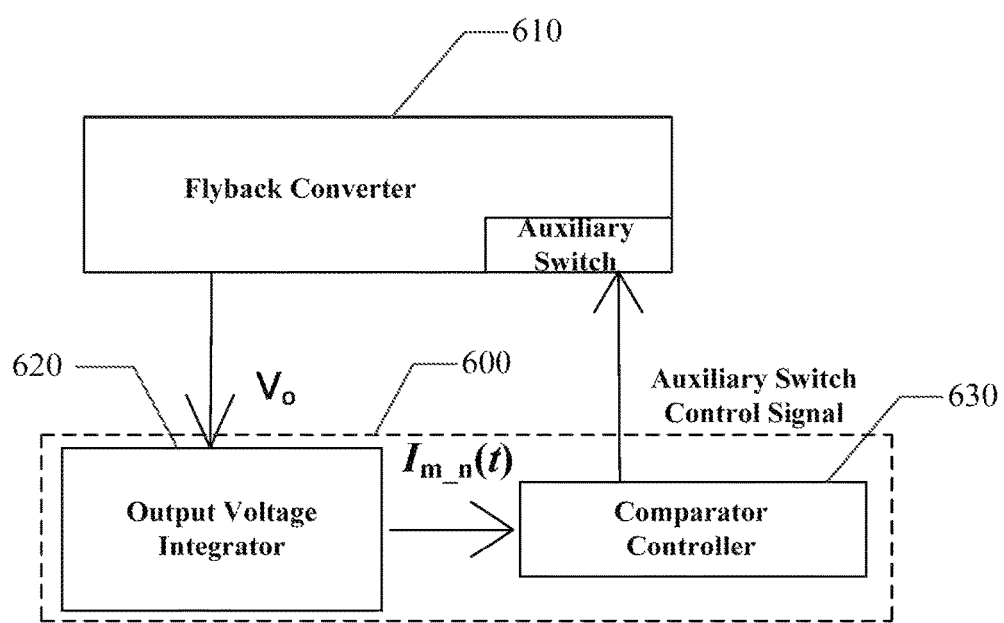
FIG. 6 schematically illustrates a control principle block diagram of a control device according to an exemplary embodiment of the present disclosure.

Based on the above contents, in an exemplary embodiment, there is provided a control device 600, referring to FIG. 6, which is used for controlling a flyback converter 610 including an auxiliary switch. As shown in FIG. 6, the control device 600 may include: an output voltage integrator 620 and a comparator controller 630.

The output voltage integrator 620 is configured to integrate an output voltage of the flyback converter 610 to obtain an amplitude of a negative magnetizing current of the flyback converter 610.

The comparator controller 630 is configured to compare the obtained amplitude of the negative magnetizing current with a reference value, and turn off the auxiliary switch according to a comparison result.

According to the control device 600 of this exemplary embodiment, following advantages may be achieved. On the one hand, the output voltage of the flyback converter 610 is integrated to obtain an amplitude of the negative magnetizing current of the flyback converter 610, such that the amplitude of the negative magnetizing current with different outputs may be obtained. On the other hand, the obtained amplitude of the negative magnetizing current is compared with a reference value, and the auxiliary switch is turned off according to a comparison result, such that zero voltage switching of the primary-side switch with different outputs may be achieved by reasonably setting the reference value.

In this exemplary embodiment, the flyback converter 610 further includes a primary-side switching circuit, a secondary-side rectifier, a transformer, and an output capacitor (not shown). The primary-side switching circuit includes a primary-side power switch, the secondary-side rectifier includes a first end and a second end, where the first end and the second end are electrically connected to the transformer and the output capacitor respectively.

In an embodiment, before the primary-side power switch is turned on, the flyback converter 610 is caused to generate a negative magnetizing current by turning on and turning off the auxiliary switch. The output voltage is detected and an integral control is performed on the output voltage to obtain information $I_{m\_n}(t)$ on the amplitude of the negative magnetizing current. A reference value $I_{m\_N}$ of the magnetizing negative current is set. When the amplitude of the negative magnetizing current is greater than or equal to the reference value, the comparator controller 630 outputs a control signal to turn off the auxiliary switch. Afterward, the negative magnetizing current serves as an initial value, and the zero voltage switching (ZVS) of the primary-side power switch is achieved via resonance of the magnetizing inductor $L_m$ and a parasitic capacitor $C_{EQ}$ of a primary-side circuit. By reasonably setting the reference value of the magnetizing negative current, the zero voltage switching (ZVS) of the primary-side power switch may be achieved with different outputs within a whole load range and a whole input voltage range. In this embodiment, the parasitic capacitor $C_{EQ}$ includes a parasitic capacitor of the primary-side power switch $S_1$ and a parasitic capacitor of a primary-side coil of the transformer T.

It is to be noted that in this exemplary embodiment, the output voltage of the flyback converter 610 is variable. For example, the output voltage of the flyback converter 610 may be 5V, 9V, 15V or 20V and so on, which is not specially limited in the present disclosure.

Figure 7:
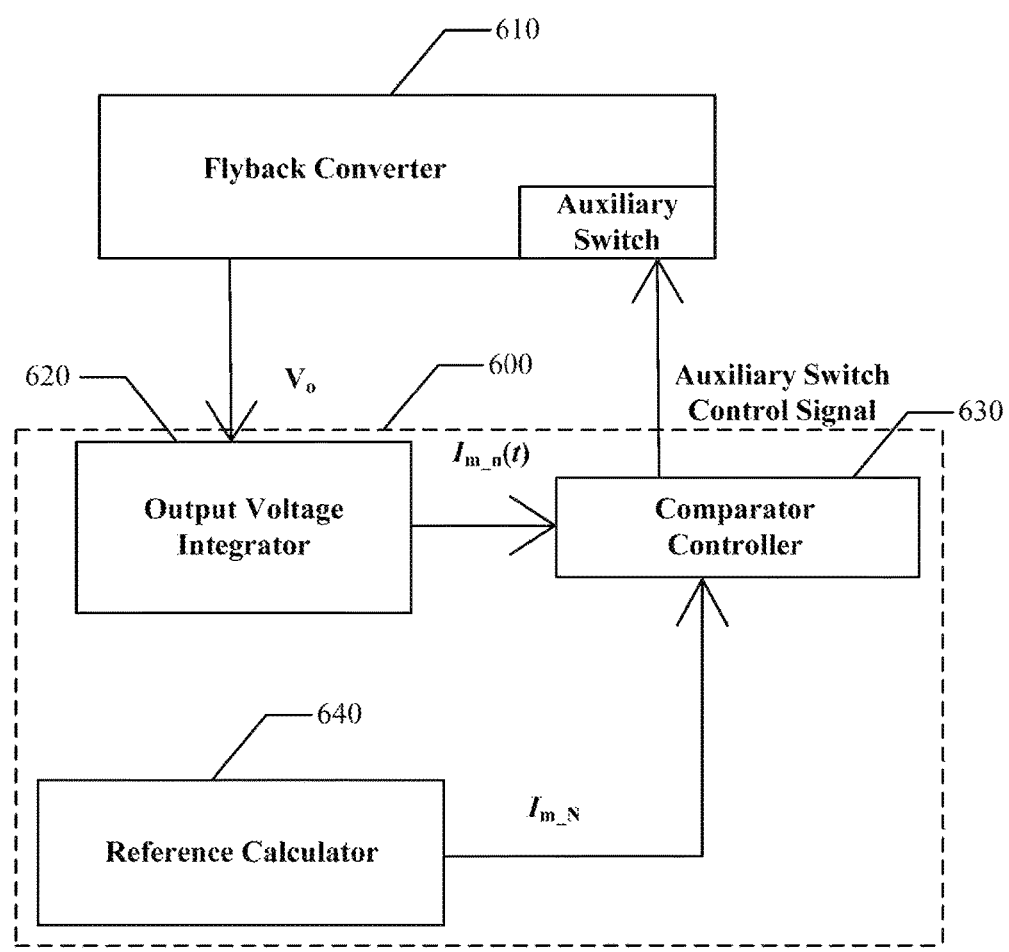
FIG. 7 schematically illustrates a control principle block diagram of a control device according to another exemplary embodiment of the present disclosure.

As shown in FIG. 7, in this exemplary embodiment, in order to reasonably set the reference value, the control device 600 may further include a reference calculator 640, which is configured to set the reference value $I_{m\_N}$ based on an input voltage or/and an output voltage of the flyback converter 610.

Figure 5:
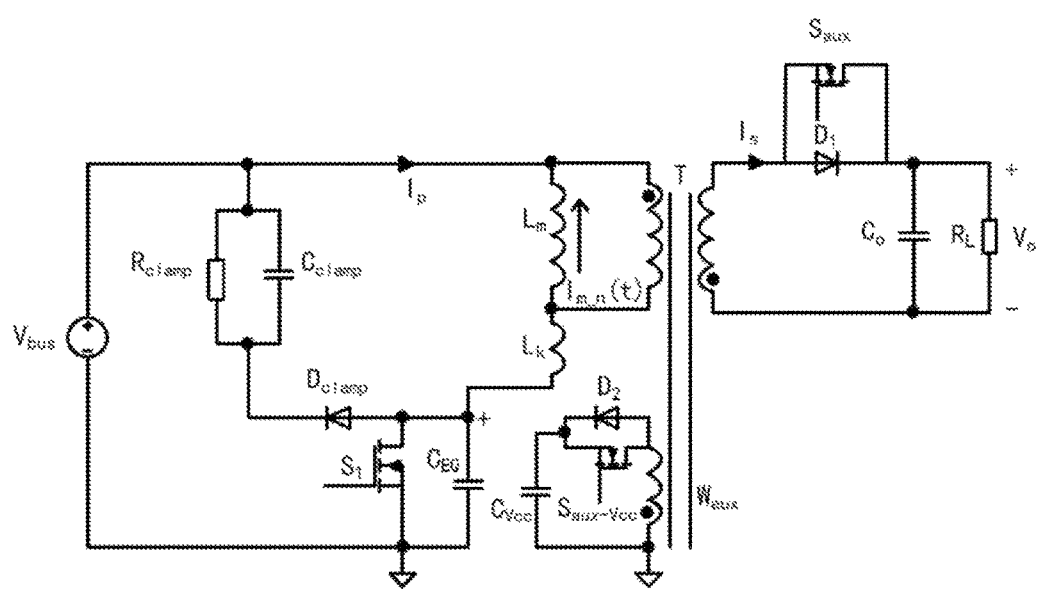
FIG. 5 schematically illustrates a circuit diagram of an RCD clamp flyback converter according to another typical structure.

In addition, in some exemplary embodiments, the flyback converter 610 may be the active clamp flyback converter as shown in FIG. 1 or the RCD clamp flyback converter as shown in FIG. 3 or FIG. 5, but the flyback converter in the exemplary embodiments of the present disclosure is not limited thereto.

Further, in some exemplary embodiments, the auxiliary switch of the flyback converter 610 may be the clamp switch $S_2$ as shown in FIG. 1 or the synchronous rectifier $S_R$ as shown in FIG. 3, but the auxiliary switch in the exemplary embodiments of the present disclosure is not limited thereto. For example, as shown in FIG. 5, the secondary side is provided with the RCD clamp flyback converter with diode rectifier, and the auxiliary switch thereof may be a switch $S_{aux}$ connected in parallel with a diode $D_1$, or the auxiliary switch thereof may be a switch $S_{aux\_VCC}$ connected in series with an auxiliary winding $W_{aux}$. It is to be noted that in this exemplary embodiment, the control device 600 may be applicable to different operating modes, including a discontinuous current mode and a discontinuous current mode boundary, which is not specially limited by the present disclosure.

Figure 8:
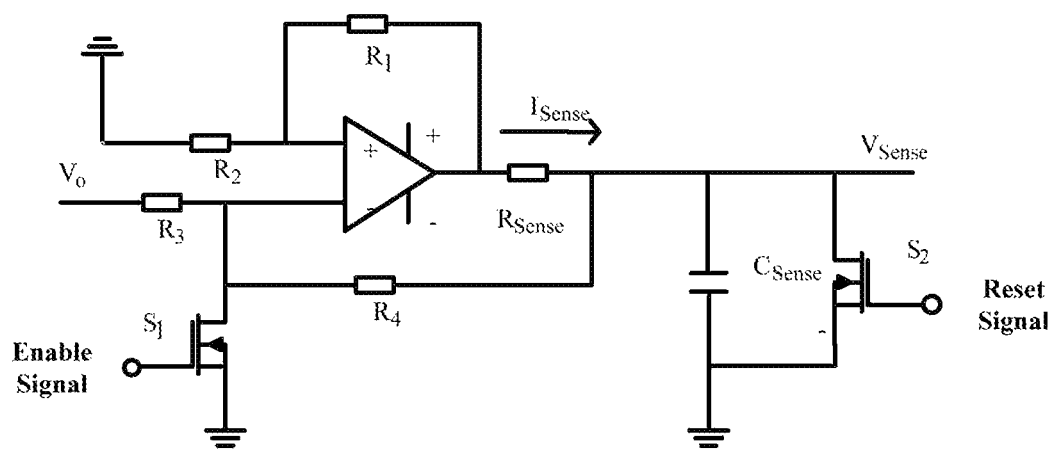
FIG. 8 schematically illustrates a circuit diagram of an output voltage integrator according to still another exemplary embodiment of the present disclosure.

In some exemplary embodiments, the output voltage integrator 620 may be implemented in a digital circuit or an analog circuit, but is not limited thereto. Taking the analog circuit as an example, as shown in FIG. 8, output voltage integrator includes an amplifier and resistors $R_1$-$R_4$, $R_{sense}$. As can be seen from a circuit principle, as long as the following formula is satisfied:

$$\frac{R_3}{R_4 + R_3} = \frac{R_4}{R_4 + R_3} = \frac{R_2}{R_1 + R_2} = 0.5 \tag{2}$$

That is, $R_1=R_2$, $R_3=R_4$,
the following formula may be obtained:

$$I_{sense} = \frac{V_o}{R_{sense}} \tag{3}$$

The $R_{sense}$ is a fixed given value, and thus according to the Formula (3), the voltage signal $V_o$ is converted into a current signal $I_{sense}$. A capacitor $C_{sense}$ is charged using the current signal $I_{sense}$. The voltage of the capacitor $C_{sense}$ is embodied as an integral signal of the output voltage $V_o$:

$$V_{sense}(t) = \frac{1}{C_{sense}} \int_0^t \frac{V_o}{R_{sense}} dx \quad (4)$$

The following formula may be obtained:

$$V_{sense}(t) = \frac{1}{R_{sense}C_{sense}} V_o t \quad (5)$$

$C_{sense}$ and $R_{sense}$ are known parameters. Therefore, the integral signal $V_{sense}$ of the output voltage may be obtained by detecting the output voltage $V_o$.

FIG. 8 illustrates a circuit diagram of an output voltage integrator according to an exemplary embodiment. As shown in FIG. 8, an enable signal acts on a switching transistor $S_1$ and is set to be effective for a low level. When the enable signal is a high level, the switching transistor $S_1$ is turned on, and the integrating circuit is forbidden to work, whereas when the enable signal is a low level, the switching transistor $S_1$ is turned off, and the integrating circuit starts to work. A reset signal acts on a switching transistor $S_2$ and is set to be effective for a high level. When the reset signal is a low level, the switching transistor $S_2$ is turned off, the capacitor $C_{sense}$ is charged to output a voltage integration signal $V_{sense}$, and an integrating circuit maintains an operation state; and when the reset signal is a high level, the switching transistor $S_2$ is turned on, the capacitor $C_{sense}$ is fully discharged, and therefore the voltage integration signal $V_{sense}$ is 0, and the integrating circuit is reset and stops working. In another embodiment, an effective level signal of the integral signal also may be a high level, and an effective level signal of the reset signal also may be a low level, which is not limited herein. In another embodiment, the switch S1 and the enable signal may be not provided.

Figure 9:
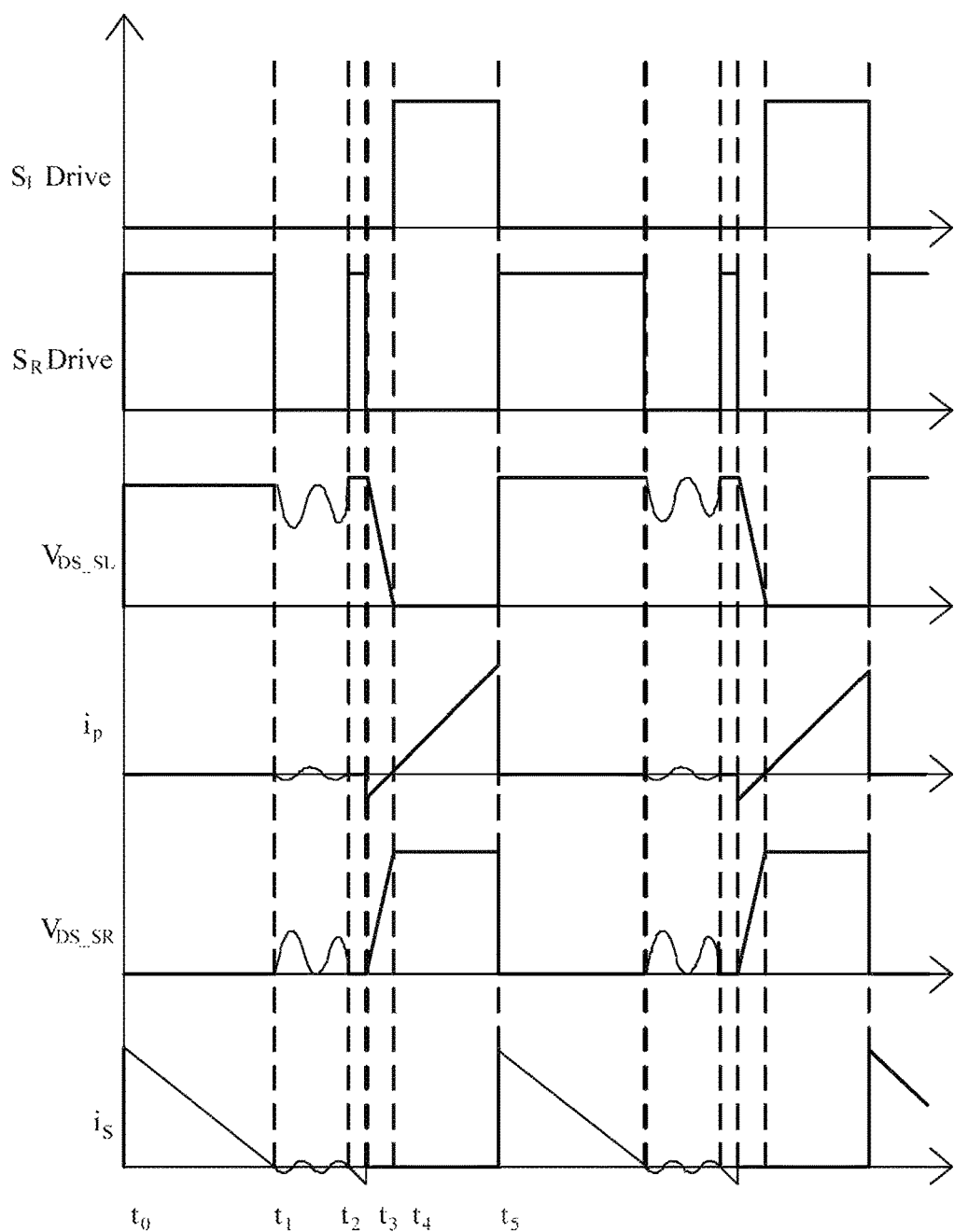
FIG. 9 schematically illustrates a discontinuous current mode control waveform diagram of an RCD clamp flyback converter according to still another exemplary embodiment of the present disclosure.

In this exemplary embodiment, for the discontinuous current mode, the enable signal of the output voltage integrator may be obtained via a turn-on signal of the auxiliary switch. As shown in FIG. 2, at the moment of $t_2$, a rising edge signal of the drive signal $S_2$ is the turn-on signal of the auxiliary switch. As shown in FIG. 9, at the moment of $t_2$, a rising edge signal of the drive signal $S_R$ is the turn-on signal of the auxiliary switch. The enable signal may be obtained by detecting the rising edge signal. In an embodiment, the enable signal also may be synchronized with the rising edge signal, or may be obtained by delaying the rising edge signal.

Figure 10:
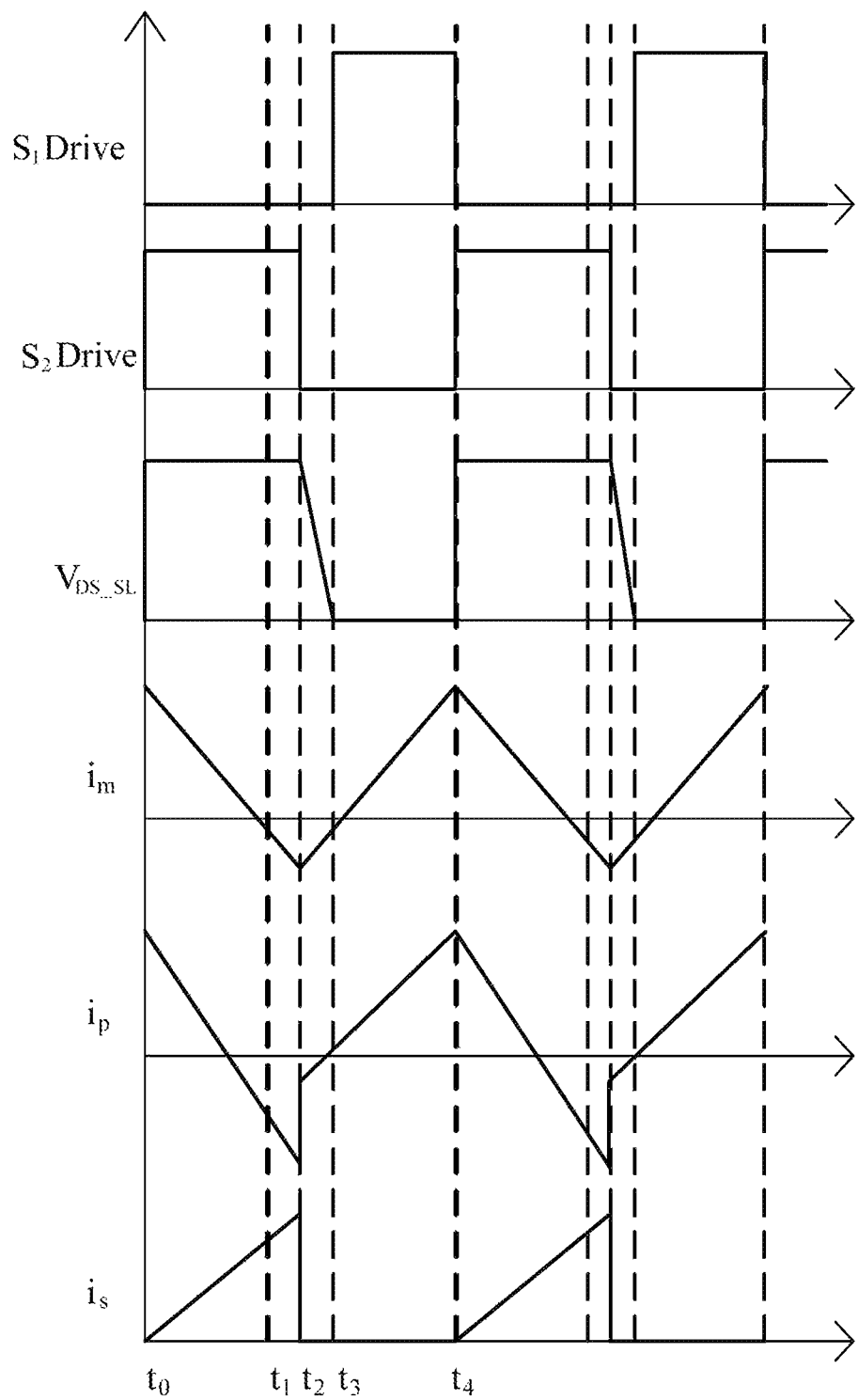
FIG. 10 schematically illustrates a discontinuous current mode boundary control waveform diagram of an active clamp flyback converter according to still another exemplary embodiment of the present disclosure.

Further, in this exemplary embodiment, for the discontinuous current mode boundary, the enable signal of the integrating circuit may be obtained by detecting a zero crossing point of the negative magnetizing current (for example, the moment $t_1$ in FIG. 4; or the moment $t_1$ in FIG. 10). Specifically, detecting the zero crossing point of the negative magnetizing current may be achieved by means of a current transformer, a sampling resistor, or an on-state resistance of a power device such as an on-state resistance of the auxiliary switch.

In some embodiments, the reset signal of the output voltage integrator may be obtained via a turn-off signal of the auxiliary switch (such as a falling edge signal of the drive signal $S_2$ at the moment of $t_3$ in FIG. 2, a falling edge signal of the drive signal $S_R$ at the moment of $t_2$ in FIG. 4, a falling edge signal of the drive signal $S_R$ at the moment of $t_3$ in FIG. 9, or a falling edge signal of the drive signal $S_2$ at the moment of $t_2$ in FIG. 10). In an embodiment, the reset signal may be synchronized with the turn-off signal of the auxiliary switch, or may be obtained by delaying the turn-off signal.

Figure 11:
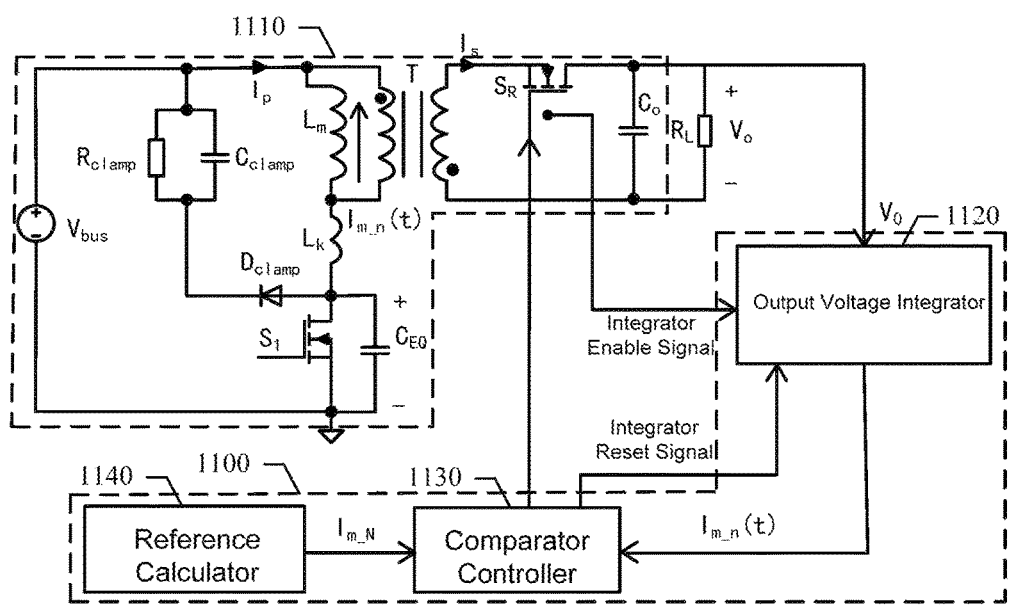
FIG. 11 schematically illustrates a specific embodiment of a voltage integrating, detecting and controlling method of an RCD clamp flyback converter according to still another exemplary embodiment of the present disclosure.

FIG. 11 illustrates a specific embodiment of a control device. As shown in FIG. 11, the control device 1100 is configured to control the flyback converter 1110. The control device 1100 includes: an output voltage integrator 1120, a comparator controller 1130, and a reference calculator 1140. The flyback converter 1110 is an RCD clamp flyback converter, including a primary-side switching circuit, a secondary-side rectifier, a transformer T and an output capacitor $C_o$. The primary-side switching circuit includes a primary-side power switch $S_1$, the secondary-side rectifier includes a synchronous rectifier $S_R$, and the secondary-side rectifier is electrically connected to the transformer T and the output capacitor $C_o$ respectively. In this embodiment, the flyback converter 1110 works in the discontinuous current mode.

In this embodiment, the control device 1100 obtains an enable signal via a turn-on signal of a secondary conduction of the synchronous rectifier $S_R$, such as the driving signal $S_R$ at the moment of $t_2$ in FIG. 9, and enables the output voltage integrator 1120 via the enable signal. The output voltage integrator 1120 integrates according to the received output voltage signal $V_o$, obtains an amplitude $I_{m\_n}$ of the negative magnetizing current of a primary-side coil according to Formula (1), and outputs the amplitude $I_{m\_n}$ to the comparator controller 1130. The comparator controller 1130 compares the amplitude $I_{m\_n}$ of the negative magnetizing current with a reference value $I_{m\_N}$ of the reference calculator 1140. When the $I_{m\_n}$ is greater than or equal to the $I_{m\_N}$, the comparator controller 1130 outputs a control signal to turn off the synchronous rectifier $S_R$. Meanwhile, the comparator controller 1130 outputs a reset signal according to the turn-off signal of the synchronous rectifier $S_R$ to reset the output voltage integrator 1120.

Figure 12:
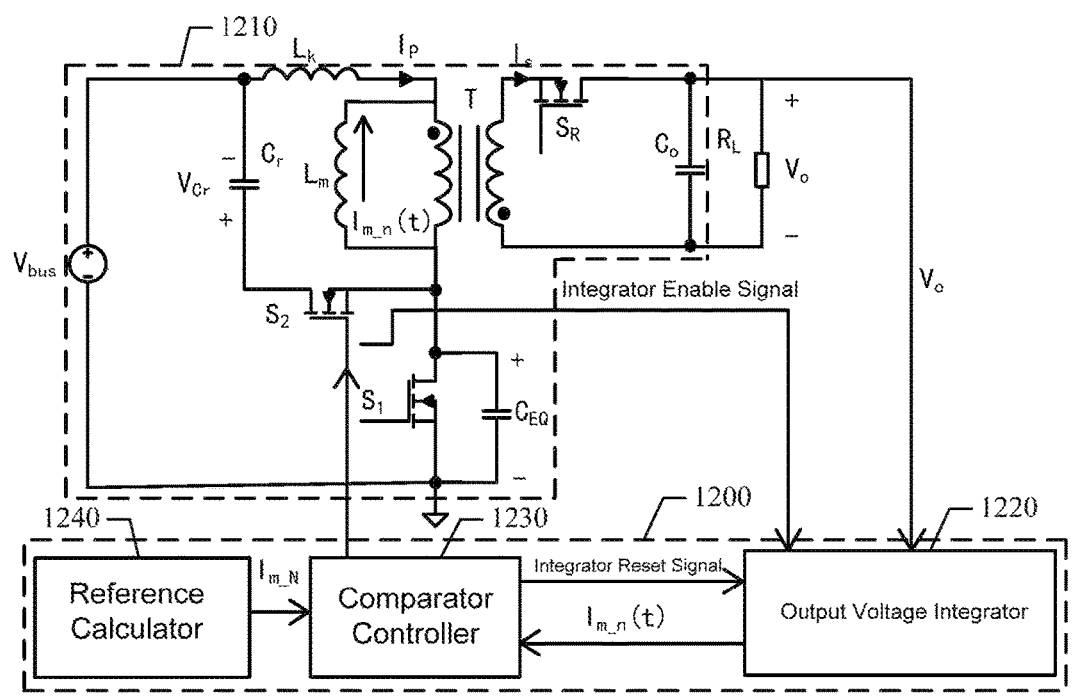
FIG. 12 schematically illustrates a specific embodiment of a turn-on time detection and control method of an active clamp flyback converter according to still another exemplary embodiment of the present disclosure.

FIG. 12 illustrates another specific embodiment of a control device. As shown in FIG. 12, the control device 1200 is configured to control the flyback converter 1210. The control device 1200 includes: an output voltage integrator 1220, a comparator controller 1230, and a reference calculator 1240. The flyback converter 1210 is an active clamp flyback converter, including a primary-side switching circuit, a secondary-side rectifier, a transformer T and an output capacitor $C_o$. The primary-side switching circuit includes a primary-side power switch $S_1$ and a clamp switch $S_2$, the secondary-side rectifier includes a synchronous rectifier $S_R$, and the secondary-side rectifier is electrically connected to the transformer T and the output capacitor $C_o$ respectively. In this embodiment, the flyback converter works in the discontinuous current mode.

In this embodiment, the control device 1200 obtains an enable signal of the integrator via a turn-on signal of the clamp switch $S_2$, such as the turn-on signal of the $S_2$ at the moment of $t_2$ in FIG. 2. The output voltage integrator 1220 receives the output voltage signal $V_o$ and integrates according to the output voltage signal $V_o$ to obtain an amplitude of the negative magnetizing current of a primary-side coil. The comparator controller 1230 receives the amplitude $I_{m\_n}$ and compares the amplitude $I_{m\_n}$ of the negative magnetizing current with a reference value $I_{m\_N}$ of the reference calculator 1240. When the $I_{m\_n}$ is greater than or equal to the reference value $I_{m\_N}$, the comparator controller 1230 outputs a control signal to turn off the clamp switch $S_2$. Meanwhile, the comparator controller 1230 outputs a reset signal of the output voltage integrator according to the turn-off signal of the clamp switch $S_2$ to reset the output voltage integrator 1220.

In some embodiments, for setting the reference value, in case of low voltage input ($V_{bus}$<$nV_o$), the zero voltage switching (ZVS) of a primary-side power transistor may be achieved without the aid of the negative magnetizing current; and in case of high voltage input ($V_{bus}$>$nV_o$), to achieve the zero voltage switching (ZVS) of the primary-side power transistor, the minimum amplitude of the negative magnetizing current may satisfy:

$$I_{m\_N} > \frac{\sqrt{V_{bus}^2 - (nV_o)^2}}{\sqrt{L_m / C_{EQ}}} \quad (6)$$

where $I_{m\_N}$ denotes the reference value, $V_{bus}$ denotes an input voltage, and $C_{EQ}$ denotes a parasitic capacitance value.

According to the above Formula (6), for a concrete circuit design, the turn ratio n, the magnetizing inductance $L_m$ and the parasitic capacitance $C_{EQ}$ are fixed. To achieve the zero voltage switching (ZVS) of the primary-side power transistor, the reference value $i_{m\_N}$ is dependent on the input voltage $V_{bus}$ and the output voltage $V_o$. Thus, the reference calculator may adjust the reference value $I_{m\_N}$ dependent on the input voltage $V_{bus}$ and the output voltage $V_o$ of the flyback converter.

However, to adjust the reference value $I_{m\_N}$, following two variables may be monitored when the above method is used: the input voltage $V_{bus}$ and the output voltage $V_o$, causing the above control so complex. The effect of the output voltage on the reference value may be neglectable when the flyback converter operates in case of high voltage input ($V_{bus}$>$nV_o$). That is, the reference value may be merely related to the input voltage, and thus setting the reference value may be greatly simplified.

$$I_{m\_N} > \frac{V_{bus}}{\sqrt{L_m / C_{EQ}}} \quad (7)$$

In some embodiments, there may be two methods for setting the reference value as below.

In a method for setting a fixed reference value, to achieve the zero voltage switching (ZVS) of the primary-side power switch within a whole input voltage range, the reference value is set according to the maximum input voltage, namely:

$$I_{m\_N} = \frac{V_{bus\_max}}{\sqrt{L_m / C_{EQ}}} \quad (8)$$

where $V_{bus\_max}$ denotes the maximum value of the input voltage.

As to the method for setting a fixed reference value, when the input voltage is the maximum value $V_{bus\_max}$, the zero voltage switching (ZVS) of the primary-side power switch may be exactly satisfied. However, when the input voltage is a low voltage, the amplitude of the negative magnetizing current generated by this control method is greater than the amplitude of the negative magnetizing current required for achieving the zero voltage switching (ZVS) of the primary-side power transistor, by which extra loss may be caused and thus the efficiency optimization may be impacted. The method for setting a fixed reference value may be used in an application scenario where efficiency requirement is not so critical.

For an application scenario where the efficiency requirement is critical, a method for setting a negative magnetizing current reference value varying with the input voltage may be employed to optimize the efficiency of the converter. Therefore, the reference value may be set as:

$$I_{m\_N}(V_{bus}) = \frac{V_{bus}}{\sqrt{L_m / C_{EQ}}} \quad (9)$$

where the $I_{m\_N}(V_{bus})$ denotes the reference value.

For a concrete circuit design, the magnetizing inductance $L_m$ and the parasitic capacitance $C_{EQ}$ are fixed. As can be known from the above Formula (9), the reference value is proportional to the input voltage $V_{bus}$, and the reference calculator may directly calculate the reference value $I_{m\_N}$ according to the input voltage value $V_{bus}$ detected by an input voltage detector.

Figure 13:
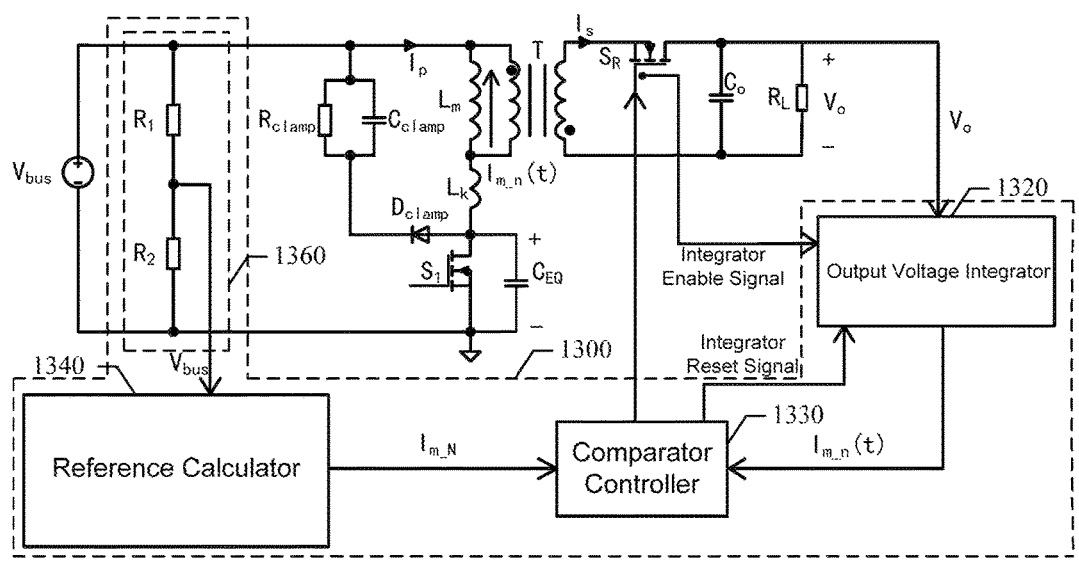
FIG. 13 schematically illustrates a specific embodiment of a method for setting a reference value of an RCD clamp flyback converter that varies with an input voltage according to still another exemplary embodiment of the present disclosure.

FIG. 13 illustrates still another specific embodiment of a control device. The structure in FIG. 13 is similar to that in FIG. 11, and the structure in FIG. 13 further includes a specific example of the reference calculator. As shown in FIG. 13, the control device 1300 further includes an input voltage detector 1360. In this embodiment, the input voltage detector 1360 includes a first resistor $R_1$ and a second resistor $R_2$. The input voltage information $V_{bus}$ is detected by dividing voltage of the first resistor $R_1$ and the second resistor $R_2$. The reference calculator 1340 receives the input voltage information $V_{bus}$ from the input voltage detector 1360, and outputs a reference value $I_{m\_N}$ to a comparator controller 1330. An enable signal is obtained via a turn-on signal of the secondary conduction of the synchronous rectifier, such as the driving signal $S_R$ at the moment of $t_2$ in FIG. 9. An output voltage integrator 1320 is enabled by the enable signal. The output voltage integrator 1320 integrates according to an output voltage signal Vo to obtain an amplitude $I_{m\_n}$ of the negative magnetizing current of a primary-side coil. The comparator controller 1330 compares the amplitude $I_{m\_n}$ of the negative magnetizing current with a reference value $I_{m\_N}$ of the reference calculator 1340. When the $I_{m\_n}$ is greater than or equal to the reference value $I_{m\_N}$, the comparator controller 1330 outputs a control signal to turn off the synchronous rectifier $S_R$. The comparator controller 1330 also outputs a reset signal of the integrator to reset the output voltage integrator 1320.

Figure 14:
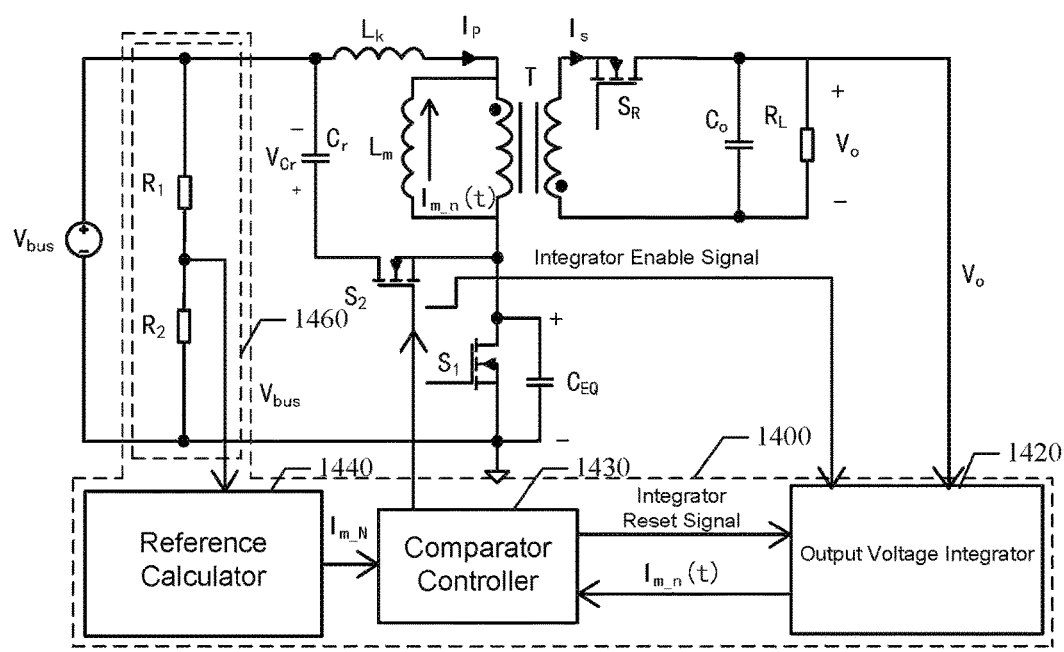
FIG. 14 schematically illustrates a specific embodiment of a method for setting a reference value of an active clamp flyback converter that varies with an input voltage according to still another exemplary embodiment of the present disclosure.

FIG. 14 illustrates still another specific embodiment of a control device. The structure in FIG. 14 is similar to that in FIG. 11, but the structure in FIG. 14 further includes a specific example of the reference calculator. As shown in FIG. 14, the control device 1400 further includes an input voltage detector 1460. In this embodiment, the input voltage detector 1460 includes a first resistor $R_1$ and a second resistor $R_2$. The input voltage information $V_{bus}$ is detected by the first resistor $R_1$ and the second resistor $R_2$. The reference calculator 1440 receives the input voltage information $V_{bus}$ and outputs a reference value according to the input voltage information $V_{bus}$. An enable signal is obtained via turn-on signal of the clamp switch $S_2$. An output voltage integrator 1420 is enabled by the enable signal, and the output voltage signal Vo is delivered to the output voltage integrator 1420. The output voltage integrator 1420 integrates according to an output voltage signal to obtain an amplitude $I_{m\_n}$ of the negative magnetizing current of a primary-side coil. The comparator controller 1430 compares the amplitude $I_{m\_n}$ of the negative magnetizing current with a reference value $I_{m\_N}$ of the reference calculator 1440. When the $I_{m\_n}$ is greater than or equal to the reference value $I_{m\_N}$, the comparator controller 1430 outputs a control signal to turn off the clamp switch $S_2$, and also outputs a reset signal of the output voltage integrator to reset the output voltage integrator 1420.

Figure 15:
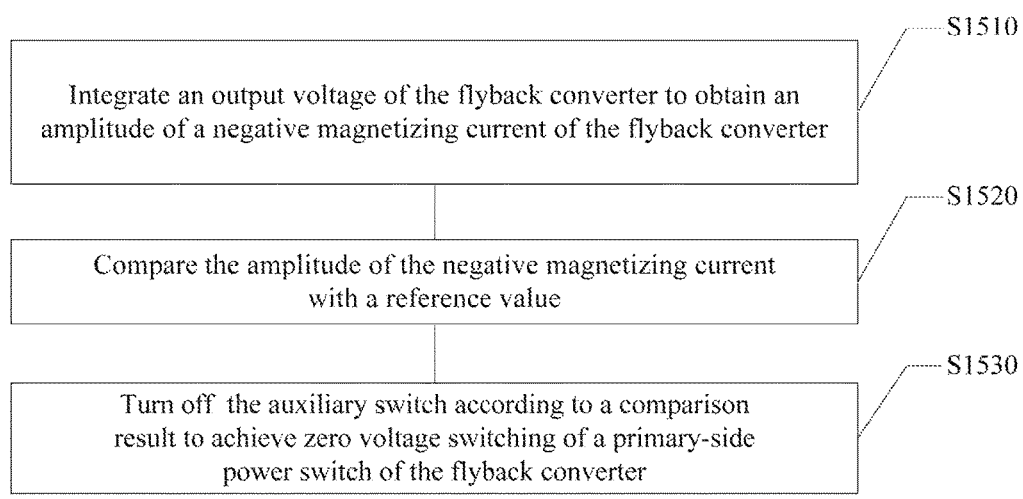
FIG. 15 schematically illustrates a flowchart of a control method according to still another exemplary embodiment of the present disclosure.

In this exemplary embodiment, there is further provided a control method, which may be applied to the flyback converter as shown in FIG. 6-FIG. 14. The flyback converter includes an auxiliary switch. Referring to FIG. 15, the control method may include following steps:

In step S1510, an output voltage of the flyback converter is integrated to obtain an amplitude of a negative magnetizing current of the flyback converter.

In step S1520: the amplitude of the negative magnetizing current is compared with a reference value.

In step S1530, the auxiliary switch is turned off according to a comparison result to achieve zero voltage switching of a primary-side power switch of the flyback converter.

According to the control method of this exemplary embodiment, following advantages may be achieved. On the one hand, the output voltage of the flyback converter is integrated to obtain an amplitude of the negative magnetizing current of the flyback converter, such that the amplitude of the negative magnetizing current with different outputs s may be obtained. On the other hand, the obtained amplitude of the negative magnetizing current is compared with a reference value, and turn-off of the auxiliary switch is controlled according to a comparison result, such that zero voltage switching of the primary-side switch with different outputs within a whole input voltage range (such as 90-264 Vac) may be achieved by reasonably setting the reference value.

Further, in some exemplary embodiments, the control method may further include: comparing the obtained amplitude of the negative magnetizing current with a reference value; and turning off the auxiliary switch when the amplitude of the negative magnetizing current is greater than or equal to the reference value.

Further, in this exemplary embodiment, the control method may further include: setting the reference value based on an input voltage of the flyback converter.

Further, in this exemplary embodiment, setting the reference value based on an input voltage of the flyback converter may include: setting the reference value based on the maximum value of the input voltage of the flyback converter.

Furthermore, in this exemplary embodiment, the control method may further include: setting the reference value based on the input voltage and an output voltage of the flyback converter.

In an embodiment, the flyback converter is an RCD clamp flyback converter or an active clamp flyback converter.

In an embodiment, an operating mode of the flyback converter is a discontinuous current mode or a discontinuous current mode boundary.

In an embodiment, the auxiliary switch is a synchronous rectifier, a clamp switch, or a switch connected in parallel with a secondary-side rectifier of the flyback converter.

Further, in this exemplary embodiment, the integrating the output voltage of the flyback converter includes: integrating the output voltage of the flyback converter by means of an integrating circuit in response to an enable signal, and resetting the integrating circuit in response to a reset signal.

Further, in this exemplary embodiment, in a discontinuous current mode, the enable signal is obtained by detecting a turn-on signal of the auxiliary switch; and in a discontinuous current mode boundary, the enable signal is obtained by detecting a zero crossing point of the negative magnetizing current.

Further, in this exemplary embodiment, the zero crossing point of the negative magnetizing current is detected by means of a current transformer, a sampling resistor, or an on-state resistance of the auxiliary switch.

Further, in this exemplary embodiment, the reset signal is obtained via a turn-off signal of the auxiliary switch.

Further, in this exemplary embodiment, the achieving zero voltage switching of the primary-side power switch of the flyback converter includes: achieving the zero voltage switching of the primary-side power switch of the flyback converter via resonance of a magnetizing inductor and a parasitic capacitor in the flyback converter.

Furthermore, another exemplary embodiment of the present disclosure provides a switching power supply, which may include the control device according to any one of the preceding embodiments. The switching power supply of this exemplary embodiment adopts the control device, and thus at least has all the corresponding advantages of the control device.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. The scope of the present disclosure is only restricted by the appended claims.

What is claimed is:

1. A control device, applied to a flyback converter, the flyback converter comprising an auxiliary switch, the control device comprising:
    an output voltage integrator, configured to integrate an output voltage of the flyback converter to obtain an amplitude of a negative magnetizing current of the flyback converter;
    a comparator controller, configured to compare the obtained amplitude of the negative magnetizing current with a reference value, and turn off the auxiliary switch according to a comparison result; and
    a reference calculator, configured to set the reference value based on an input voltage of the flyback converter.

2. The control device according to claim 1, wherein the auxiliary switch comprises any one selected from a group comprising a synchronous rectifier, a clamp switch, a switch connected in parallel with a secondary-side rectifier of the flyback converter, and a switch connected in series with an auxiliary winding of the flyback converter.

3. The control device according to claim 1, wherein the output voltage integrator is configured to start the output voltage integrator via an enable signal, and reset the output voltage integrator via a reset signal.

4. The control device according to claim 3, wherein an operating mode of the flyback converter comprises a discontinuous current mode or a discontinuous current mode boundary,
in the discontinuous current mode, the enable signal is obtained by detecting a turn-on signal of the auxiliary switch; and
in the discontinuous current mode boundary, the enable signal is obtained by detecting a zero crossing point of the negative magnetizing current.

5. The control device according to claim 4, wherein detecting a zero crossing point of the negative magnetizing current comprises: detecting the zero crossing point of the negative magnetizing current by means of a current transformer, a sampling resistor, or an on-state resistance of the auxiliary switch.

6. The control device according to claim 3, wherein the reset signal is obtained by detecting a turn-off signal of the auxiliary switch.

7. The control device according to claim 1, wherein the comparator controller is configured to turn off the auxiliary switch when the amplitude of the negative magnetizing current is greater than or equal to the reference value.

8. The control device according to claim 1, wherein the flyback converter comprises a Resistor Capacitor Diode (RCD) clamp flyback converter or an active clamp flyback converter.

9. The control device according to claim 1,
the reference calculator is further configured to set the reference value based on the input voltage and an output voltage of the flyback converter.

10. The control device according to claim 1, wherein an output voltage of the flyback converter is variable.

11. The control device according to claim 10, wherein the output voltage of the flyback converter is 5V, 9V, 15V or 20V.

12. A switching power supply, comprising a control device applied to a flyback converter comprising an auxiliary switch, wherein the control device comprises:
an output voltage integrator, configured to integrate an output voltage of the flyback converter to obtain an amplitude of a negative magnetizing current of the flyback converter;
a comparator controller, configured to compare the obtained amplitude of the negative magnetizing current with a reference value, and turn off the auxiliary switch according to a comparison result; and
a reference calculator, configured to set the reference value based on an input voltage of the flyback converter.

13. A control method, applied to a flyback converter, the flyback converter comprising an auxiliary switch, the control method comprising:
integrating an output voltage of the flyback converter to obtain an amplitude of a negative magnetizing current of the flyback converter;
comparing the amplitude of the negative magnetizing current with a reference value; and
turning off the auxiliary switch according to a comparison result to achieve zero voltage switching of a primary-side power switch of the flyback converter,
wherein the reference value is set based on an input voltage of the flyback converter.

14. The control method according to claim 13, wherein the auxiliary switch comprises any one selected from a group comprising a synchronous rectifier, a clamp switch, a switch connected in parallel with a secondary-side rectifier of the flyback converter, and a switch connected in series with an auxiliary winding of the flyback converter.

15. The control method according to claim 13, wherein the integrating an output voltage of the flyback converter comprises:
integrating the output voltage of the flyback converter by means of an integrating circuit in response to an enable signal, and resetting the integrating circuit in response to a reset signal.

16. The control method according to claim 15, wherein an operating mode of the flyback converter comprises a discontinuous current mode or a discontinuous current mode boundary,
in the discontinuous current mode, the enable signal is obtained by detecting a turn-on signal of the auxiliary switch; and
in the discontinuous current mode boundary, the enable signal is obtained by detecting a zero crossing point of the negative magnetizing current.

17. The control method according to claim 16, wherein the zero crossing point of the negative magnetizing current is detected by means of a current transformer, a sampling resistor, or an on-state resistance of the auxiliary switch.

18. The control method according to claim 15, wherein the reset signal is obtained via a turn-off signal of the auxiliary switch.

19. The control method according to claim 13, wherein achieving zero voltage switching of a primary-side power switch of the flyback converter comprises:
achieving zero voltage switching of the primary-side power switch of the flyback converter via resonance of an magnetizing inductor and a parasitic capacitor in the flyback converter.

20. The control method according to claim 13, wherein the turning off the auxiliary switch according to a comparison result to achieve zero voltage switching of a primary-side power switch of the flyback converter further comprises:
turning off the auxiliary switch when the amplitude of the negative magnetizing current is greater than or equal to the reference value.

21. The control method according to claim 13, wherein the flyback converter comprises a Resistor Capacitor Diode (RCD) clamp flyback converter or an active clamp flyback converter.

22. The control method according to claim 13,
wherein the reference value is set based on the input voltage and an output voltage of the flyback converter.

23. The control method according to claim 13, wherein the reference value is set based on a maximum value of the input voltage of the flyback converter.

24. The control method according to claim 13, wherein an output voltage of the flyback converter is variable.

25. The control method according to claim 24, wherein the output voltage of the flyback converter is 5V, 9V, 15V or 20V.

* * * * *